US007209951B2

(12) United States Patent
Goldberg

(10) Patent No.: US 7,209,951 B2
(45) Date of Patent: Apr. 24, 2007

(54) METHOD AND SYSTEM FOR MODIFYING THE CONTENT OF E-MAIL TRANSMISSIONS BASED ON CUSTOMIZATION SETTINGS

(76) Inventor: Bernel Goldberg, 13413 NE. 27th St., Bellevue, WA (US) 98005

( * ) Notice: Subject to any disclaimer, the term of this patent is extended or adjusted under 35 U.S.C. 154(b) by 915 days.

(21) Appl. No.: 10/066,243

(22) Filed: Feb. 1, 2002

(65) Prior Publication Data
US 2002/0169839 A1 Nov. 14, 2002

Related U.S. Application Data

(63) Continuation-in-part of application No. 09/811,497, filed on Mar. 20, 2001, now abandoned.

(51) Int. Cl.
*G06F 15/16* (2006.01)
(52) U.S. Cl. ............... 709/206; 709/203; 709/207; 709/219; 709/245; 709/246; 707/9; 707/10
(58) Field of Classification Search ........ 709/205–207, 709/232, 245–246, 203, 217, 219; 707/9, 707/10
See application file for complete search history.

(56) References Cited

U.S. PATENT DOCUMENTS

| | | | |
|---|---|---|---|
| 5,634,005 A | | 5/1997 | Matsuo |
| 6,073,133 A | * | 6/2000 | Chrabaszcz ............ 707/10 |
| 6,085,201 A | * | 7/2000 | Tso ..................... 715/505 |
| 6,092,101 A | | 7/2000 | Birrell et al. |
| 6,192,396 B1 | * | 2/2001 | Kohler .................. 709/206 |
| 6,453,338 B1 | | 9/2002 | Shiono |
| 6,460,074 B1 | | 10/2002 | Fishkin |
| 6,470,379 B1 | * | 10/2002 | Mori ..................... 709/206 |
| 6,499,021 B1 | | 12/2002 | Abu-Hakima |
| 6,510,453 B1 | * | 1/2003 | Apfel et al. ............ 709/206 |
| 6,529,942 B1 | * | 3/2003 | Gilbert ................... 709/206 |
| 6,687,741 B1 | * | 2/2004 | Ramaley et al. ....... 709/206 |
| 6,732,149 B1 | | 5/2004 | Kephart |
| 6,779,178 B1 | * | 8/2004 | Lloyd et al. ........... 717/174 |

(Continued)

FOREIGN PATENT DOCUMENTS

EP 1087315 A2 3/2001

(Continued)

*Primary Examiner*—Saleh Najjar
*Assistant Examiner*—Duong Oanh
(74) *Attorney, Agent, or Firm*—Mitch Harris, Atty at Law, LLC; Andrew M. Harris

(57) ABSTRACT

A method and system for modifying the content of e-mail transmissions based on customization settings determines when an e-mail user has customized an e-mail message and prompts the user to accept or reject automatic modification of the e-mail message text to indicate a particular customization settings. The e-mail program checks the customization settings, then the e-mail program prompts the user if a customization is set for which a text modification can be automatically made. For example, a "cc:" list may be added to the message text in response to the checking detecting a list of copied recipients. The e-mail program may further parse the message text in order to avoid prompting the user to add text associated with a customization for which the user has already made an indication within the message content (message body, subject line, et cetera).

27 Claims, 3 Drawing Sheets

U.S. PATENT DOCUMENTS

| | | | |
|---|---|---|---|
| 6,816,835 B2 * | 11/2004 | Hayashi | 704/260 |
| 6,839,741 B1 * | 1/2005 | Tsai | 709/217 |
| 7,016,937 B1 * | 3/2006 | Malik | 709/206 |
| 2002/0049793 A1 * | 4/2002 | Okumura et al. | 707/526 |
| 2002/0069223 A1 | 6/2002 | Goodisman et al. | |
| 2002/0107924 A1 * | 8/2002 | Walsh | 709/206 |
| 2002/0169840 A1 | 11/2002 | Sheldon et al. | |
| 2004/0073634 A1 | 4/2004 | Haghpassand | |
| 2004/0205674 A1 * | 10/2004 | Delgado et al. | 715/536 |

FOREIGN PATENT DOCUMENTS

EP          1087315 A2 *  3/2001

* cited by examiner

METHOD AND SYSTEM FOR MODIFYING THE CONTENT OF E-MAIL TRANSMISSIONS BASED ON CUSTOMIZATION SETTINGS

RELATED APPLICATIONS

The present application is a continuation-in-part of U.S. patent application entitled "METHOD AND SYSTEM FOR COMPLETING E-MAIL TRANSMISSIONS" Ser. No. 09/811,497 (abandoned) filed on Mar. 20, 2001, from which it claims priority, and is further related to U.S. patent application entitled "METHOD AND SYSTEM FOR COMPLETING E-MAIL TRANSMISSIONS BASED ON CONTENT DETECTION" Ser. No. 10/038,261 (abandoned) filed on Jan. 7, 2002, which is a continuation in part of application Ser. No. 09/811,497 referenced above. This application is also related to U.S. patent application entitled "METHOD AND SYSTEM FOR CUSTOMIZING E-MAIL TRANSMISSIONS BASED ON CONTENT DETECTION" Ser. No. 10/062,739 filed on Feb. 3,2002 and issued as U.S. Pat. No. 7,092,993. All of the above applications are herein incorporated by reference.

BACKGROUND OF THE INVENTION

1. Field of the Invention

The present invention relates generally to electronic mail systems, and more specifically, to a method and system for modifying the content of e-mail transmissions by prompting a user based on the customization settings of an electronic message.

2. Background of the Invention

Present-day network systems communicate through a variety of channels in order to interconnect computers. Electronic mail is in widespread use as a mechanism for communicating messages and for transferring documents, images and other media such as sound files.

E-mail programs and other programs such as Internet browsers having e-mail capability permit a computer user to create a message that is sent to an e-mail server for the recipient of the message. Typical e-mail programs provide a variety of features for customizing an e-mail message. For example, attachment lists permit the computer user to attach documents such as word-processor output files or encoded images such as scanned photographs that are rendered in a data storage format such as the joint photography and electronics group (JPEG) format, or other media such as sound files, etc. E-mail programs also permit the setting of priority level so that a recipient may be notified of the urgency of a message without reading the content and/or flagging an e-mail message as personal, private or confidential. Further, the above-described e-mail programs permit copying (cc:) and blind-copying (bcc:) additional intended recipients of an e-mail message, adding an electronic signature, and/or encrypting e-mail content for security.

Often, a computer user generating an electronic mail message will customize an e-mail message, but does not comment within the message on particular customizations (e.g., attachments) that should be noted by the e-mail recipient.

Therefore, it would be desirable to provide a method and system for modifying the content of an e-mail transmission by using the customization settings set for the e-mail message to notify the recipient of customizations that have been performed.

SUMMARY OF THE INVENTION

The above objective of modifying the content e-mail messages is achieved in a method and system that receive a user input indicating that an e-mail message has been completed, check the e-mail message customization settings, and in response to detecting a customization setting, generating a user prompt to permit the user to insert text and/or other appropriate indications within the e-mail message to notify a recipient of particular customizations that have been performed on the e-mail message. The method may be embodied in a computer program product for performing the method within a general purpose computer.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
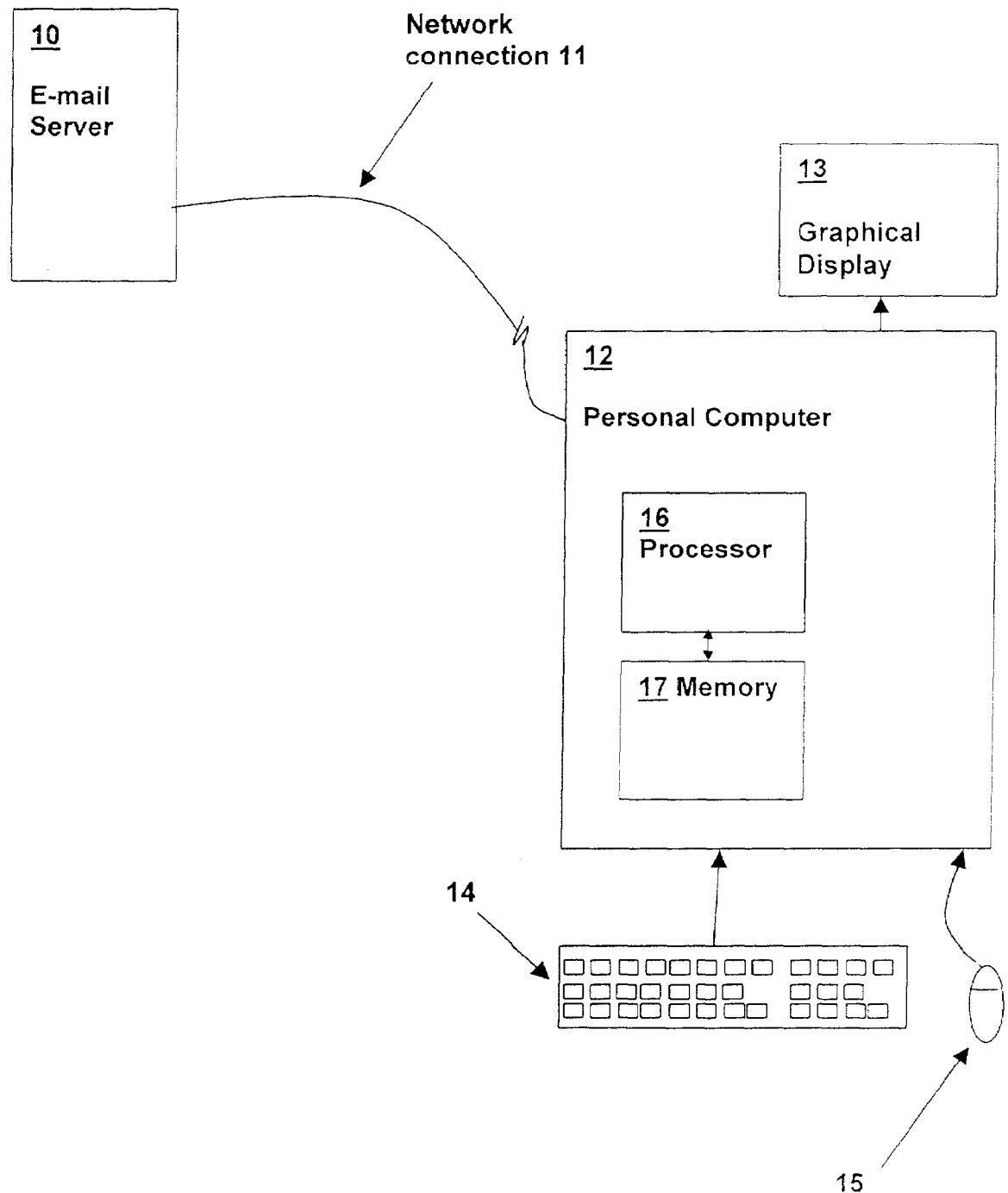
FIG. 1 is a block diagram depicting a networked computer system in which a preferred embodiment of the invention may be practiced.

Referring now to the figures and in particular to FIG. 1, a networked computer system within which a preferred embodiment of the present invention may be practiced is depicted in a block To support e-mail functions, an e-mail server 10 is coupled to the network via a network connection 11. Also coupled to the network is a personal computer 12 having a processor 16 coupled to a memory 17 for executing program instructions from memory 17. Personal computer 12 is coupled to a graphical display 13 for displaying program output and input devices such as a mouse 15 and a keyboard 14 for receiving user input. The networked computer system may be coupled to a public network such as the Internet, or may be a private network such as the various "intra-nets" that are implemented within corporate offices and other installations requiring secure data communications.

Within memory 17, an e-mail program embodying a method in accordance with a preferred embodiment of the present invention is executed by processor 16. Personal computer 12 is included to provide a demonstrative example of a general purpose computer, and it will be understood by those skilled in the art that the techniques of the present invention apply to a variety of other e-mail applications such as dedicated Internet appliances and large mainframe computers having user terminals. The present invention also applies to personal e-mail appliances such as personal digital assistants (PDAs) and e-mail enabled pagers and cellular telephones.

Figure 2:
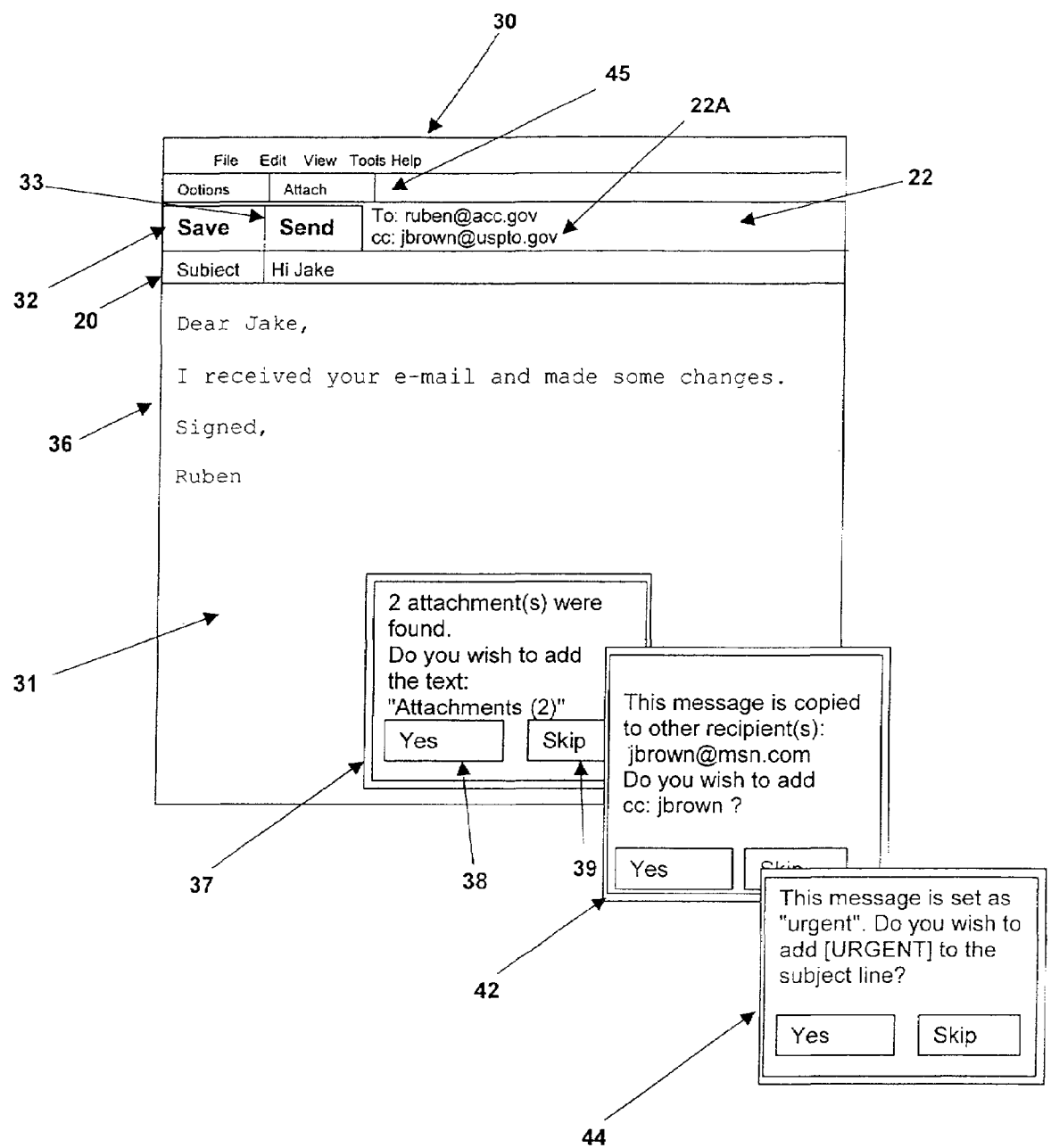
FIG. 2 is a pictorial diagram depicting output of an e-mail program displayed on the graphic display of FIG. 1, having a user prompt in accordance with a preferred embodiment of the invention.

Referring now to FIG. 2, an output of an e-mail program in accordance with a preferred embodiment of the invention is depicted. While the invention is depicted with screens in American English language, the invention may be adapted to other languages and use clues that are localized to e-mail use in other languages and other countries. E-mail program output 30 forms a user output on graphical display 13 to permit a computer user to interact with the e-mail program executing within personal computer 12. E-mail program output 30 has a frame with menu options and a message area 31 for entering the text of e-mail messages via keyboard 14 or other input device such as a dictation program with audio input. E-mail program output further has a subject area 20 for entering an e-mail message subject heading (or displaying an existing subject heading generated when forwarding an e-mail message, etc.).

A toolbar 45 includes buttons for setting message options or initiating an options menu and an attach button for providing attachments to add attachments to the e-mail. The e-mail message is sent by pressing a send button 33 in response to which the e-mail message and any attachments are sent to recipient's e-mail server 10, with the characteristics in accordance with the customization options that are set. Or, the e-mail message may be saved along with the customized characteristics for later transmission by pressing a save button 32. The recipient and copied recipient list 22 provides a mechanism for entering the e-mail addresses of intended recipients.

The above-incorporated patent application "METHOD AND SYSTEM FOR COMPLETING E-MAIL TRANSMISSIONS" teaches a method and system that parse an e-mail message for clues indicating that an e-mail program user intended to customize a particular message based on the content of the e-mail message text. The method and system described therein provides a means for reminding a user to set customization settings when the content of the message indicates that the e-mail program user likely intended to do so. In contrast, the present invention concerns a method for notifying the recipient of customizations within an e-mail message (e.g., attachments, other recipients, etc.) so that the recipient takes note of the customizations.

By checking the e-mail message customization settings prior to sending or upon saving an e-mail message, the e-mail program can prompt the sender to insert information within the e-mail message in response to detecting the customization setting during a check or scan of the settings when the user saves or sends the message. In an alternative embodiment, the message can be parsed for strings that already indicate to the recipient that a customization is present, and the prompting of the sender to insert information is then skipped. The method of the present invention may be used in concert with the method described in the above-incorporated patent application, and the parsing of the message text may be simultaneously performed for the method of the present invention and the method described in the above-incorporated patent application.

The above-described customization settings check may also be performed in response to the user clicking an icon, entering a menu option or taking another action to trigger a check of customization settings and generating prompts in response to detected customization settings. Examples of customization settings are: priority settings, encryption settings, the recipient list ("to:", "cc:" and "bcc:" recipients), electronic signatures, content type and message attachments. When prompting an e-mail program user, the method and system of the present invention provide text information for insertion into the message text or subject heading that will indicate the presence of a customization to the recipient of the e-mail message.

Table 1 shows exemplary customization settings and actions for text modification prompts for various customization features of the e-mail program. The examples are for illustrative purposes only and are not intended to be limiting. The insertion string for a given detected customization may be customizable for and by each user and the insertion point (subject line or message text) may be programmable as well. The prompt may or may not display the string or the prompt may merely indicate that a string should be inserted by the user.

TABLE 1

| Customization Feature | Exemplary Action |
|---|---|
| Message Priority | Prompt to insert priority (e.g., "Urgent") in subject line |
| Encryption | Prompt to insert "Encrypted" at bottom of message |
| cc: and bcc: | Prompt to generate cc: list at bottom of message text (and optionally bcc: list) |
| Electronic Signature | Prompt to add "signed electronically" to bottom of message text |
| Attachment | Prompt to add "Attachment(s)" at the bottom of message text |
| Message type | Prompt to add message type (e.g., "Private") in subject line |

When the e-mail program checks the customization settings and finds that the sender of the e-mail has customized an e-mail message, the user may be queried by a prompt dialog 37. As described above, prompt dialog 37 may be generated in further response to the e-mail program determining that there is no text in the message that indicates a particular customization setting, or may be generated independent of message content. Prompt dialog 37 notifies the user that two attachments were found and asks the user if they wish to insert the text "Attachments (2)" within the e-mail message (generally at the bottom). The sender may then insert the text by pressing yes button 38, or the user may elect to skip text insertion via skip button 39. Alternatively, the method and system may the prompt altogether and insert a predetermined string. Similarly, dialogs 42–44 demonstrate possible prompts based on other customizations detected. For example, a "cc:" list entry 22A triggers generation of priority dialog 42, which asks the user if they wish to add a "cc:" list in accordance with the copied recipient (in this example the e-mail program removes the server address and extracts the name portion of the address). A customization setting of "Urgent" causes dialog 44 to be presented, prompting for insertion of the text "[URGENT]" within subject line 20.

Figure 3:
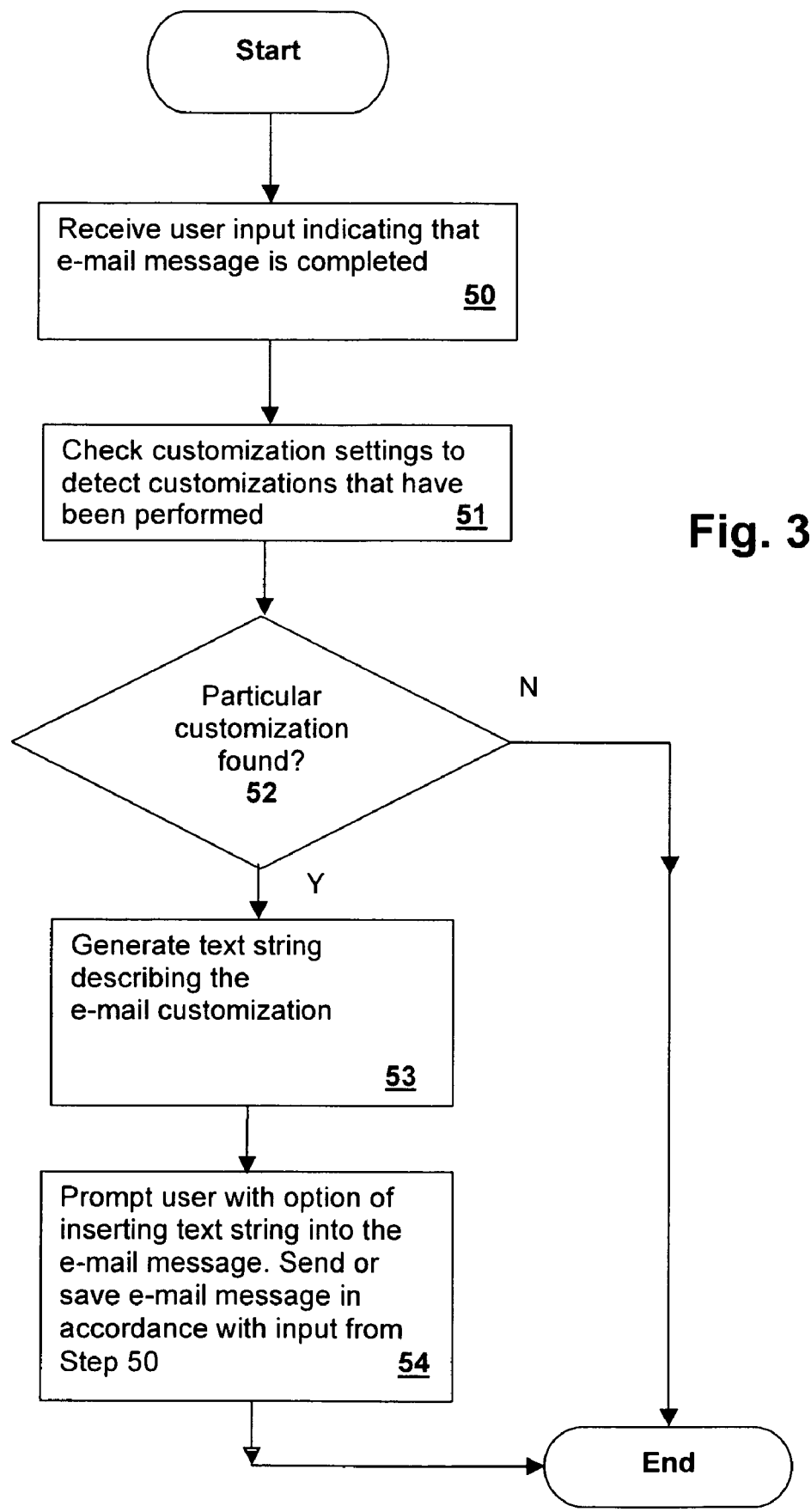
FIG. 3 is a flowchart depicting operation of an e-mail completion system in accordance with a preferred embodiment of the invention.

Referring now to FIG. 3, the e-mail modification method of the present invention is depicted in a flowchart. When the e-mail sender provides a user input indicating that an e-mail message is completed (step 50), the customization settings are checked to detect customizations that have been performed (step 51). If a particular customization is found (decision 52) (and optionally if text is not present indicating the customization), a text string is generated describing the e-mail customization (step 53). Then, the user is prompted to present the option of inserting the text string into the message (subject line or message body) (step 54), otherwise the e-mail message is sent or saved in accordance with the user input in step 50. Note that the exemplary system depicted in the flowchart of FIG. 3 may be implemented in a variety of fashions, such as skipping the customization detection (step 53) based on a pre-parsing for existing customization indications. For example, the checking may be skipped for customizations if the parser finds a string indicating the particular customization is present.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for completing an e-mail transmission, comprising:
    receiving a user input indicating that an e-mail message is complete;
    checking customization settings to determine whether or not to offer modification of the text of the e-mail message to notify a recipient of a detected customization setting; and
    in response to said checking detecting a particular customization setting, generating a user prompt to permit a user to automatically modify the text of said e-mail message.

2. The method of claim 1, further comprising:
    parsing said e-mail message to determine whether or not said user has already entered text that will notifying a recipient of a particular customization setting; and
    in response to said parsing detecting said entered text, skipping said generating of said user prompt for said particular customization setting.

3. The method of claim 1, wherein said user input indicating that said e-mail message is complete is a user input instructing an e-mail program to send said e-mail message.

4. The method of claim 1, wherein said user input indicating that said e-mail message is complete is a user input instructing an e-mail program to save said e-mail message.

5. The method of claim 1, wherein said user input indicating that said e-mail message is complete is a user input instructing an e-mail program to check said e-mail message.

6. The method of claim 1, wherein said particular customization setting is an attachment list, and wherein said automatically modifying modifies said text to include the string "Attachment(s)".

7. The method of claim 6, wherein said attachment list has a predetermined number of attachment entries, and wherein said automatically modifying further modifies said text to include a numeric indication of said number of attachment entries.

8. The method of claim 1, wherein said particular customization setting is a copy recipient list, and wherein said modifying modifies said text to include a "cc:" list.

9. The method of claim 1, wherein said particular customization indicates a level of urgency of said e-mail message and wherein said modifying modifies a subject line of said message to include an indication of said level of urgency.

10. A system for completing an e-mail transmission, comprising:
    a memory for storing program instructions and data;
    a processor coupled to said memory for executing said program instructions; and
    a user input device coupled to said processor for receiving user input, wherein said program instructions include instructions for
        receiving a user input indicating that an e-mail message has been completed,
        checking customization settings to determine whether or not to offer modification of the text of the e-mail message to notify a recipient of a detected customization setting, and
        in response to said checking detecting a particular customization setting, generating a user prompt to permit a user to automatically modify the text of said e-mail message.

11. The system of claim 10, wherein said program instructions further comprise program instructions for:
    parsing said e-mail message to determine whether or not said user has already entered text that will notifying a recipient of a particular customization setting; and
    in response to said parsing detecting said entered text, skipping said generating of said user prompt for said particular customization setting.

12. The system of claim 10, wherein said user input indicating that said e-mail message has been completed is a user input instructing an e-mail program to send said e-mail message.

13. The system of claim 10, wherein said user input indicating that said e-mail message has been completed is a user input instructing an e-mail program to save said e-mail message.

14. The system of claim 10, wherein said user input indicating that said e-mail message has been completed is a user input instructing an e-mail program to check said e-mail message.

15. The system of claim 10, wherein said particular customization setting is an attachment list, and wherein said program instructions for automatically modifying modify said text to include the string "Attachment(s)".

16. The system of claim 15, wherein said attachment list has a predetermined number of attachment entries, and wherein said program instructions for automatically modifying further modify said text to include a numeric indication of said number of attachment entries.

17. The system of claim 10, wherein said particular customization setting is a copy recipient list, and wherein said program instructions for modifying modify said text to include a "cc:" list.

18. The system of claim 10, wherein said particular customization indicates a level of urgency of said e-mail message and wherein said program instructions for modifying modify a subject line of said e-mail message to include an indication of said level of urgency.

19. A computer program product comprising computer readable storage medium containing program instructions for execution within a general purpose computer, wherein said program instructions comprise program instructions for:
    receiving a user input indicating that an e-mail message has been completed,
    checking customization settings to determine whether or not to offer modification of the text of the e-mail message to notify a recipient of a detected customization setting, and
    in response to said checking detecting a particular customization setting, generating a user prompt to permit a user to automatically modify the text of said e-mail message.

20. The method of claim 19, further comprising:
    parsing said e-mail message to determine whether or not said user has already entered text that will notifying a recipient of a particular customization setting; and in response to said parsing detecting said entered text, skipping said generating of said user prompt for said particular customization setting.

21. The computer program product of claim 19, wherein said user input indicating that said e-mail message has been completed is a user input instructing an e-mail program to send said e-mail message.

22. The computer program product of claim 19, wherein said user input indicating that said e-mail message has been completed is a user input instructing an e-mail program to save said e-mail message.

23. The computer program product of claim 19, wherein said user input indicating that said e-mail message has been completed is a user input instructing an e-mail program to check said e-mail message.

24. The computer program product of claim 19, particular customization setting is an attachment list, and wherein said program instructions for automatically modifying modify said text to include the string "Attachment(s)".

25. The computer program product of claim 24, wherein said attachment list has a predetermined number of attachment entries, and wherein said program instructions for automatically modifying further modify said text to include a numeric indication of said number of attachment entries.

26. The computer program product of claim 19, wherein said particular customization setting is a copy recipient list, and wherein said program instructions for modifying modify said text to include a "cc:" list.

27. The computer program product of claim 19, wherein said particular customization indicates a level of urgency of said e-mail message and wherein said program instructions for modifying modify a subject line of said e-mail message to include an indication of said level of urgency.

* * * * *